Dec. 26, 1950     C. C. STUART     2,535,242
AUXILIARY TOP WITH FOLDING SEATS
Filed Jan. 10, 1948     2 Sheets-Sheet 2
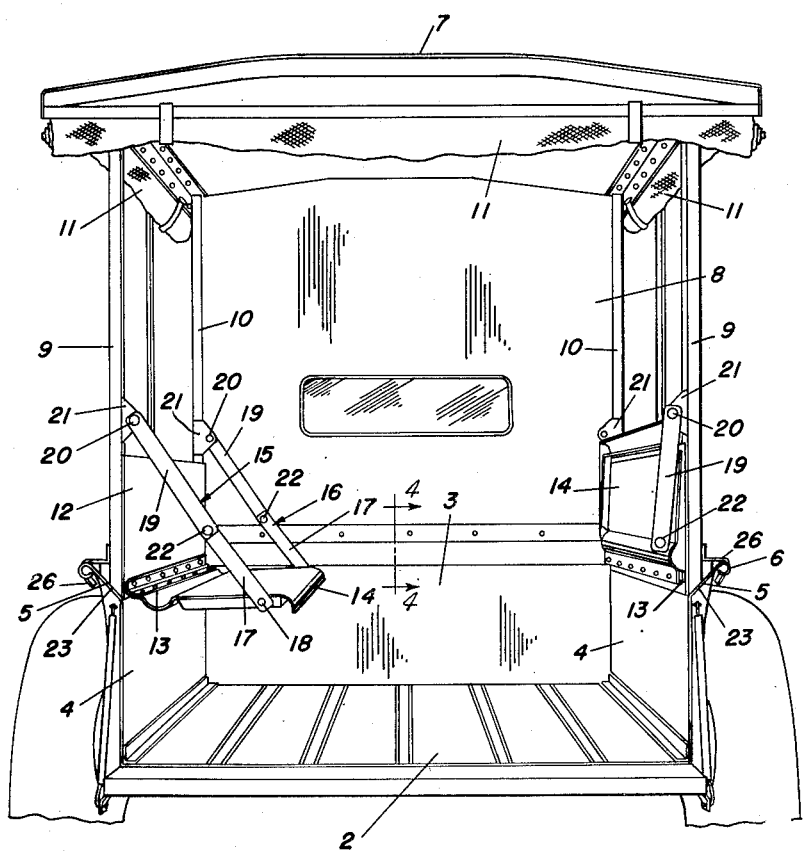
FIG_2
INVENTOR.
CLARENCE C. STUART
BY
ATTORNEYS.

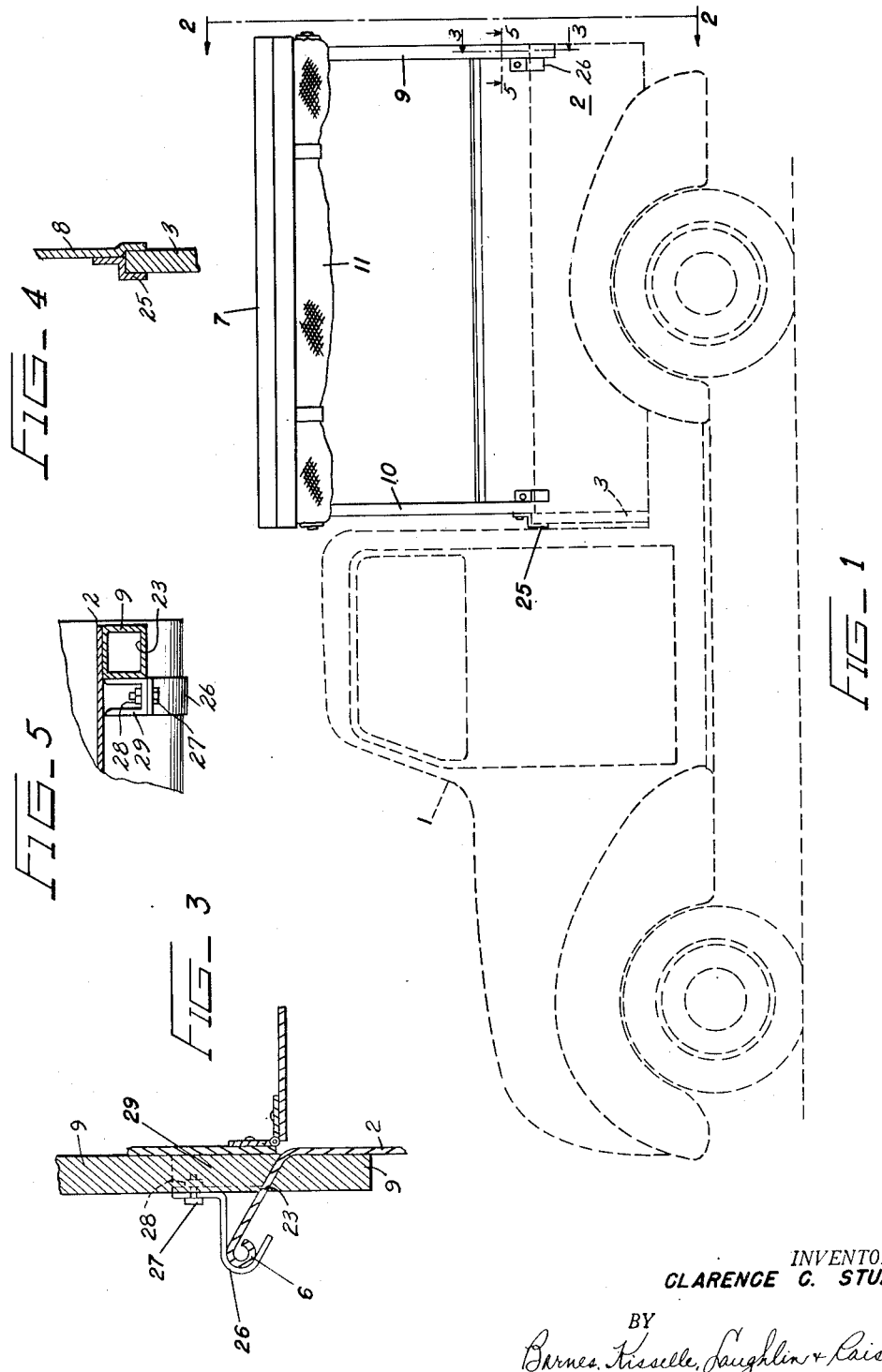

Patented Dec. 26, 1950

2,535,242

UNITED STATES PATENT OFFICE 2,535,242

AUXILIARY TOP WITH FOLDING SEATS

Clarence C. Stuart, Dearborn, Mich., assignor to Traffic Transport Engineering, Inc., Dearborn, Mich., a corporation of Michigan Application January 10, 1948, Serial No. 1,522

4 Claims. (Cl. 296—63)

This invention relates to an auxiliary top for a pick-up delivery truck.

It is an object of this invention to produce an auxiliary top for a pick-up delivery truck which will convert such delivery truck to a personnel pick-up carrier with facility and dispatch.

This object is accomplished by providing the auxiliary top with folding seats which can be readily lowered into operative position or raised into inoperative position and with clamps which facilitate assembly of the auxiliary top to, and disassembly from, the pick-up delivery truck.

Contractors and farmers, for example, with conventional pick-up delivery trucks often desire to transport help from one place to another. My auxiliary top with the folding seats can readily convert a pick-up delivery truck to a personnel transporting vehicle.

In the drawings:

Fig. 1 is a side elevation showing my auxiliary top mounted on the pick-up delivery truck.

Fig. 2 is a rear elevation taken along the line 2—2 of Fig. 1.

Fig. 3 is a detail section along the line 3—3 of Fig. 1.

Fig. 4 is a detail section along the line 4—4 in Fig. 2. Fig. 5 is a detail section along the line 5—5 in Fig. 1.

Referring more particularly to the drawings, there is shown a standard pick-up delivery truck generally designated 1, having a conventional pick-up delivery body or box 2 mounted on the chassis. Box 2 has a vertical front wall 3 and vertical side walls 4 provided with flanges 5 at the upper edges which are inclined upwardly and outwardly. As herein shown, the longitudinal edges of flanges 5 are beaded as at 6.

My auxiliary top comprises a roof 7, front wall 8, rear pillars 9, front pillars 10 and drop curtains 11 for enclosing the sides and rear of the body.

A pair of folding seats are mounted along the lower sides of the auxiliary top. Each seat comprises a seat back 12 secured to the lower portion of the front and rear pillars 9 and 10 and having hinged thereto with a piano hinge 13 a seat bottom 14. Seat back 12 forms a side wall for the auxiliary top. The seat bottom 14 is held in lowered horizontal position by a pair of jack-knifing arms 15 and 16, each of which comprises a lower link 17 pivoted to the seat bottom adjacent its front edge as at 18 and an upper link 19 pivoted as at 20 to a bracket 21 fixed to the adjacent pillar. Links 17 and 19 are pivoted to each other as at 22. The seat on the left hand side of the auxiliary top, Fig. 2, is shown in lowered position where it will seat four people, and the seat on the right hand side of the auxiliary top, in this same view, is shown in elevated position with links 17 and 19 jack-knifed. The pivot points between links 17 and 19 and between links 17 and the seat bottom and link 19 and the pillar bracket are all friction pivots or hinges so that the seat will remain in raised position when elevated. When the seats are raised the truck body or box can be used in the conventional manner.

The inclined flanges 5 are each provided with an opening as at 23 adjacent the upper edge of the side walls 4 to provide a socket for receiving the lower ends of the rear pillars 9 when the top is mounted upon box 2. The front wall 8 of the auxiliary top is arranged to overlap the rear face of the front wall 3 of the box along the top edge and is provided with a flange 25 which overlaps the front wall 3 of the box 2 along its front face and adjacent the upper edge thereof. Thus, the lower front edge of the front wall of the auxiliary top and bracket 25 serve as a socket which receives the upper edge of the front wall of the box 2 and holds the auxiliary top against movement fore and aft of the chassis.

The auxiliary top is tied down to the box by four inverted V brackets 26, two of which are mounted on the rear pillars 9 at the lower ends thereof and two of which are mounted on the front pillars at the lower ends thereof by means of bolts 27 which screw into nuts 28 welded or otherwise affixed to the inside face of U bracket 29 which are fixed to the base of the pillars 9 and 10. Thus, when the auxiliary top is mounted on body 2 with the lower ends of pillars 9 in sockets 23 and the front wall and bracket 25 overlapping the front edge of box 2, brackets 26 can be hooked over the beaded edge of the side walls of the body and then drawn into place by bolts 27 which securely ties the auxiliary top to the body 2. Upon removal of brackets 26, the auxiliary top can be readily removed from the pick-up delivery body.

Preferably each of the seat backs and bottoms are made of sheet steel but, of course, the entire auxiliary top and fold-up seats can be made of metal or wood or partly of metal and wood.

I claim:

1. An auxiliary top adapted to be removably mounted upon the box of a pick-up delivery truck, said box being of the type having upwardly and outwardly inclined flanges along the upper edges of the side walls thereof, comprising a pair of front pillars, a pair of rear pillars, a panel extending between and connecting said front pillars and forming a front wall for said top, a panel extending between and connecting the front and back pillars at each side of the top and forming side walls for the top, a pair of folding seats hinged to the side walls of the top adjacent the lower edges and on the inner side thereof, clamp members shaped to engage around the outer free edge of said upwardly and outwardly inclined flanges for clamping the top to the truck box, and locking means on said pillars for detachably engaging said clamps, said locking means being positioned on said pillars such that when the clamps are engaged with said flanges and said locking means, the lower edges of the side walls of the top overlie the upper edges of the side walls of the box.

2. An auxiliary top adapted to be removably mounted upon the box of a pick-up delivery truck, said box being of the type having upwardly and outwardly inclined flanges along the upper edges of the side walls thereof and having vertically disposed sockets adjacent said side walls at the rear end of said box, comprising a pair of front pillars, a pair of rear pillars, a panel extending between and connecting said front pillars and forming a front wall for the top, a panel extending between and connecting the front and back pillars at each side of the top and forming side walls for the top, the lower ends of said rear pillars being arranged to be inserted within said sockets, a pair of folding seats hinged to the side walls of said top adjacent the lower edges and on the inner side thereof, clamp members shaped to engage around the free outer edge of said upwardly and outwardly inclined flanges for clamping the lower ends of said rear pillars in said sockets, and locking means on said pillars for detachably engaging said clamps, said clamps and said locking means being arranged to positively lock the lower ends of said rear pillars against tilting or vertical movement within said sockets.

3. The combination as set forth in claim 2 wherein said clamping members comprise brackets having one leg portion adapted to be engaged by the locking means on said pillars, another leg portion arranged to extend around and underneath the free edge of said upwardly and outwardly inclined flanges, and an intermediate leg portion connecting said other two leg portions and arranged to extend outwardly from said pillars.

4. The combination set forth in claim 2 wherein the lower edge of the front wall of said top is provided with a downwardly opening trough and wherein said box is provided with a front wall, said downwardly opening trough being adapted to telescope over the upper edge of the front wall of said box.

CLARENCE C. STUART.

REFERENCES CITED

The following references are of record in the file of this patent:

UNITED STATES PATENTS

| Number | Name | Date |
|---|---|---|
| 304,015 | Mahan | Aug. 26, 1884 |
| 498,583 | Smawley et al. | May 30, 1893 |
| 1,179,739 | Morrison | Apr. 18, 1916 |
| 1,211,186 | Lee | Jan. 2, 1917 |
| 1,425,596 | Kramer | Aug. 15, 1922 |
| 2,048,573 | Smith | July 21, 1936 |
| 2,228,535 | Renno | Jan. 14, 1941 |
| 2,262,129 | Andrews et al. | Nov. 11, 1941 |
| 2,324,508 | Johnson | July 20, 1943 |
| 2,405,054 | Pringle | July 30, 1946 |